Patented Nov. 14, 1939

2,180,012

UNITED STATES PATENT OFFICE 2,180,012

AZO COMPOUNDS AND PROCESS FOR COLORING THEREWITH

James G. McNally and Joseph B. Dickey, Rochester, N. Y., assignors to Eastman Kodak Company, Rochester, N. Y., a corporation of New Jersey No Drawing. Application October 27, 1936, Serial No. 107,850

11 Claims. (Cl. 8—50)

This invention relates to azo compounds and more particularly to azo compounds suitable for the coloration of organic derivatives of cellulose. The invention includes the azo compounds, the process for their preparation, the process of coloring with them and materials colored with the azo compounds of the invention.

Organic derivatives of cellulose are characterized by an indifferent affinity for the usual cotton or wool dyes, especially the ordinary water soluble dyes. Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

We have found that a valuable series of azo compounds can be prepared by diazotizing a 1-amino-3-nitro-5-alkoxybenzene and coupling with suitable aromatic or heterocyclic coupling components. These compounds have the following probable formula:

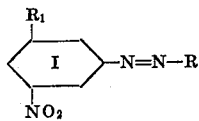

wherein R represents an aromatic or heterocyclic nucleus and $R_1$ represents an alkoxy group. Advantageously, R is an aryl nucleus of the benzene series.

The compounds of our invention represented by the above formula are unique in that all substituents in the portion of the molecule indicated by I are in the meta position to one another. The non-sulfonated compounds of our invention color organic derivatives of cellulose shades ranging from yellow to orange-yellow of good fastness to light and washing and thus constitute valuable dyes for coloring materials made of or containing organic derivatives of cellulose, particularly the organic acid esters of cellulose.

In order that our invention may be fully understood the preparation of 1-amino-3-nitro-5-alkoxybenzenes is described hereinafter.

Preparation of 1-amino-3-nitro-5-methoxybenzene

This compound may be prepared according to the method of Verneulen, Recueil des Travaux Chimiques des Pays-Bas, vol. 25, pages 17–18 (1906). Briefly, in accordance with the method there described 1, 3, 5 trinitrobenzene is converted to 3, 5-dinitroanisole by treatment with methanol and sodium and the 3,5-dinitroanisole reduced to 1-amino-3-nitro-5-methoxybenzene by dissolving in hot alcohol, cooling, adding ammonia water and passing in a stream of hydrogen sulfide.

The method given for the preparation of 1-amino-3-nitro-5-methoxybenzene is applicable to the preparation of 1-amino-3-nitro-5-alkoxybenzenes generally by substitution of the appropriate alcohol for methanol and reducing to obtain the desired compound. Thus, 1-amino-3-nitro-5-ethoxybenzene can be prepared by treating 1,3,5-trinitrobenzene with ethanol and sodium and reducing the 1-ethoxy-3,5-dintrobenzene formed to 1-amino-3-nitro-5-ethoxybenzene.

The following examples illustrate the method of preparation of the azo compounds of our invention. Quantities are expressed in parts by weight.

Example 1

16.8 parts of 1-amino-3-nitro-5-methoxybenzene are added to 100 parts of water containing about 36 parts of 36% hydrochloric acid. The mixture is cooled in any suitable manner, as by the addition of ice, for example, and diazotized by adding, with stirring, 6.9 parts of sodium nitrite dissolved in water.

17.4 parts of 1-phenyl-3-methyl-5-pyrazolone are dissolved in 200 parts of water containing 31.8 parts of sodium carbonate. Ice is added and the diazonium chloride prepared as described above is added, with stirring. After standing one hour, the mixture is made acid to litmus paper with acetic acid and the desired precipitated orange-colored compound is filtered, washed with water and dried. Cellulose acetate silk is colored an orange yellow shade by the dye compound formed.

Example 2

10.8 parts of p-cresol are dissolved in 100 parts of water containing 12 parts of sodium hydroxide. The mixture is cooled by the addition of ice, and the diazonium chloride prepared as described in Example 1 is added, with stirring. After standing one hour, the mixture is made acid to litmus with acetic acid, and the desired orange-colored azo compound recovered by filtration, washed with water and dried.

Phenol, resorcinol, salicyclic acid and β-naphthol, for example, can be substituted for p-cresol and coupled in an exactly similar manner.

Example 3

16.5 parts of ethyl-β-hydroxyethylaniline are dissolved in 105 parts of cold glacial acetic acid, and the diazonium solution prepared as described in Example 1 is then added, with stirring. After standing fifteen minutes, sodium acetate is added until the mixture no longer turns Congo red paper blue. Upon standing for several hours, water is added to precipitate the desired compound, which is recovered by filtration, washed with water and dried. Alcohol may be used in place of acetic acid as a solvent for the ethyl-β-hydroxyethylaniline. Similarly, sodium carbonate or sodium bicarbonate may be substituted for sodium acetate in the example.

Example 4

19.8 parts of 3-nitro-5-β-hydroxyethoxyaniline are diazotized with sodium nitrite in the usual manner.

22.5 parts of di-β-hydroxyethylcresidine are dissolved in a dilute aqueous hydrochloric acid solution, the resulting solution iced and the diazo solution prepared above added with stirring. After standing a few minutes the mixture is slowly made neutral to Congo red paper with sodium acetate. Upon completion of the coupling reaction the dye compound formed is recovered by filtration, washed with water and dried.

Example 5

21.2 parts of 3-nitro-5-β-methoxy-ethoxy-aniline are diazotized and coupled with 22.5 parts of di-β-hydroxyethylcresidine.

The following tabulation further illustrates the compounds included within the scope of our invention together with the color they produce on cellulose acetate silk. The compounds indicated below may be prepared by diazotizing the amines listed under the heading "Amine" and coupling with the compounds specified in the column entitled "Coupling component". The diazotization and coupling reactions may, for example, be carried out following the general procedure described in Examples 1–5, inclusive.

In employing the non-sulfonated azo derivatives of our invention as dyes for organic derivatives of cellulose they will ordinarily be applied to the material in the form of an aqueous suspension which can be prepared by grinding the dye to a paste in the presence of soap or other suitable dispersing agent and dispersing the resulting paste in water. Dyeing operations can, with advantage, be conducted at a temperature of 80–85° C., but any suitable temperature may be used. In accordance with the usual dyeing practice, the material to be dyed will ordinarily be added to the aqueous dye bath at a temperature lower than that at which the main portion of the dyeing is to be effected, a temperature approximating 45–55° C., for example, following which the temperature of the dye bath is raised to that selected for carrying out the dyeing operation. The temperature at which the dyeing is conducted will vary somewhat, depending for example, on the particular material or materials undergoing coloration.

It will be understood that the non-sulfonated azo compounds may be applied to the material to be colored in any suitable manner. Coloration may be effected, for example, by dyeing, printing or stenciling. Dispersing or solubilizing agents that can be employed for preparing suspensions of the dye include soap, sulphoricinoleic acid and sulfonated oleic, stearic or palmitic acids, or salts thereof such for instance as the sodium or ammonium salts.

The following example illustrates one satisfactory way in which dyeing may be carried out in accordance with our invention:

Example 6

2.5 parts of 3-nitro-5-methoxybenzene azo ethyl-β-hydroxyethylaniline are finely ground with soap and dispersed in 1000 parts of water. The dispersion thus prepared is heated to a temperature approximately 45–55° C. and 100 parts of cellulose acetate silk, in the form of taffeta or threads, for example, are added to the dye bath after which the temperature is gradually raised to 80–85° C. and the cellulose acetate silk worked for several hours at this latter temperature. Upon completion of the dyeing operation, the cellulose acetate silk is removed, washed with soap, rinsed and dried. The cellulose acetate silk is dyed an orange-yellow shade.

| Amine | Coupling component | Color on cellulose acetate silk |
|---|---|---|
| 1-amino-3-nitro-5-methoxybenzene | Dimethylaniline | Orange yellow. |
| Do | Diphenylamine | Do. |
| Do | p-Cresol | Do. |
| Do | Methyl-β-hydroxypropylaniline | Do. |
| Do | Di-β-hydroxypropylaniline | Do. |
| Do | Ethyl-β-hydroxyethylaniline | Do. |
| Do | Butyl-β-hydroxyethylaniline | Do. |
| Do | Isoamyl-β-hydroxyethylaniline | Do. |
| Do | Di-β-hydroxyethylaniline | Do. |
| Do | β-hydroxyethylaniline | Do. |
| Do | Ethylglycerylaniline | Do. |
| Do | Methyl-β-hydroxyethylaniline | Do. |
| Do | Propyl-β-hydroxyethylaniline | Do. |
| Do | Methylaniline | Do. |
| Do | Di-β-hydroxyethyl-α-naphthylamine | Orange red. |
| Do | Glyceryl cresidine | Orange yellow. |
| 1-amino-3-nitro-5-ethoxybenzene | Dimethylaniline | Do. |
| Do | Diphenylamine | Do. |
| Do | p-Cresol | Do. |
| Do | Methyl-β-hydroxypropylaniline | Do. |
| Do | Ethyl-β-hydroxyethylaniline | Do. |
| Do | Butyl-β-hydroxyethylaniline | Do. |
| Do | Isoamyl-β-hydroxyethylaniline | Do. |
| Do | Di-β-hydroxyethylaniline | Do. |
| Do | β-hydroxyethylaniline | Do. |
| Do | Ethylglycerylaniline | Do. |
| Do | Methyl-β-hydroxyethylaniline | Do. |
| Do | Propyl-β-hydroxyethylaniline | Do. |
| Do | Glyceryl cresidine | Do. |
| Do | Methylaniline | Do. |
| Do | Di-β-hydroxyethyl-α-naphthylamine | Orange red. |

It will be understood that dyeing operations can be carried out in a manner similar to that described above by the substitution of another organic derivative of cellulose material in place of cellulose acetate silk, or by employing a dye compound of the invention other than that employed in the example, or by substitution of both the material being dyed and the dye compound of the example.

We claim:

1. An azo compound having the general formula:

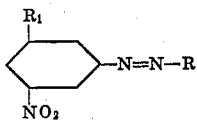

wherein R represents the residue of a nuclear non-sulfonated aryl coupling component of the benzene series containing but one benzene nucleus and $R_1$ represents an alkoxy group.

2. An azo compound having the general formula:

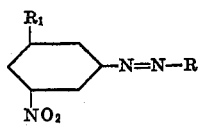

wherein R represents the residue of a nuclear non-sulfonated hydroxyalkylamine coupling component of the benzene series, said benzene coupling component containing but one benzene nucleus, and $R_1$ represents an alkoxy group.

3. An azo compound having the general formula:

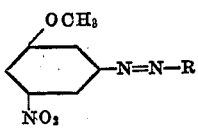

wherein R represents the residue of a nuclear non-sulfonated aryl coupling component of the benzene series containing but one benzene nucleus.

4. An azo compound having the formula:

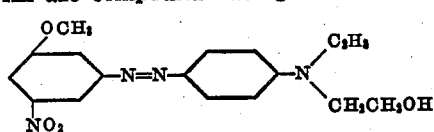

5. An azo compound having the formula:

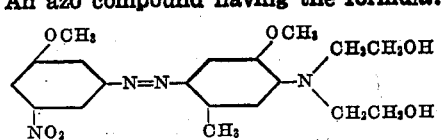

6. A process of coloring an organic derivative of cellulose which comprises applying thereto a nuclear non-sulfonated dye selected from the class of azo compounds having the general formula:

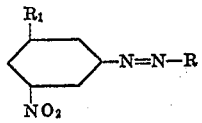

wherein R represents the residue of an aryl coupling component of the benzene series containing but one benzene nucleus and $R_1$ represents an alkoxy group.

7. A process of coloring an organic derivative of cellulose which comprises applying thereto a nuclear non-sulfonated dye selected from the class of azo compounds having the general formula:

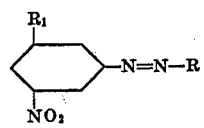

wherein R represents the residue of a nuclear non-sulfonated hydroxyalkylamine coupling component of the benzene series, said benzene coupling component containing but one benzene nucleus, and $R_1$ represents an alkoxy group.

8. A process of coloring an organic acid ester of cellulose which comprises applying thereto a nuclear non-sulfonated dye selected from the class of azo compounds having the general formula:

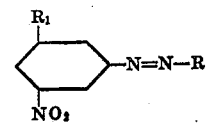

wherein R represents the residue of an aryl coupling component of the benzene series containing but one benzene nucleus and $R_1$ represents an alkoxy group.

9. A process of coloring an organic acid ester of cellulose which comprises applying thereto a nuclear non-sulfonated dye selected from the class of azo compounds having the general formula:

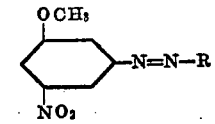

wherein R represents the residue of an aryl coupling component of the benzene series containing but one benzene nucleus.

10. A process of coloring a cellulose acetate which comprises applying directly thereto from an aqueous suspension a dye selected from the class of azo compounds having the general formula:

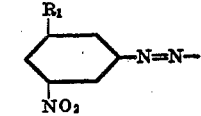

wherein $R_1$ represents an alkoxy group and R represents the residue of a nuclear non-sulfonated aryl coupling component of the benzene series containing but one benzene nucleus.

11. A process of coloring a cellulose acetate which comprises applying thereto a dye selected from the class of azo compounds having the general formula:

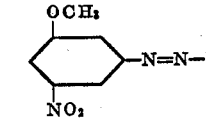

wherein R represents the residue of a nuclear non-sulfonated aryl coupling component of the benzene series containing but one benzene nucleus.

JAMES G. McNALLY.
JOSEPH B. DICKEY.